(No Model.)
F. WALKER.
AUTOMATIC FLUSHING APPARATUS.
No. 468,979. Patented Feb. 16, 1892.
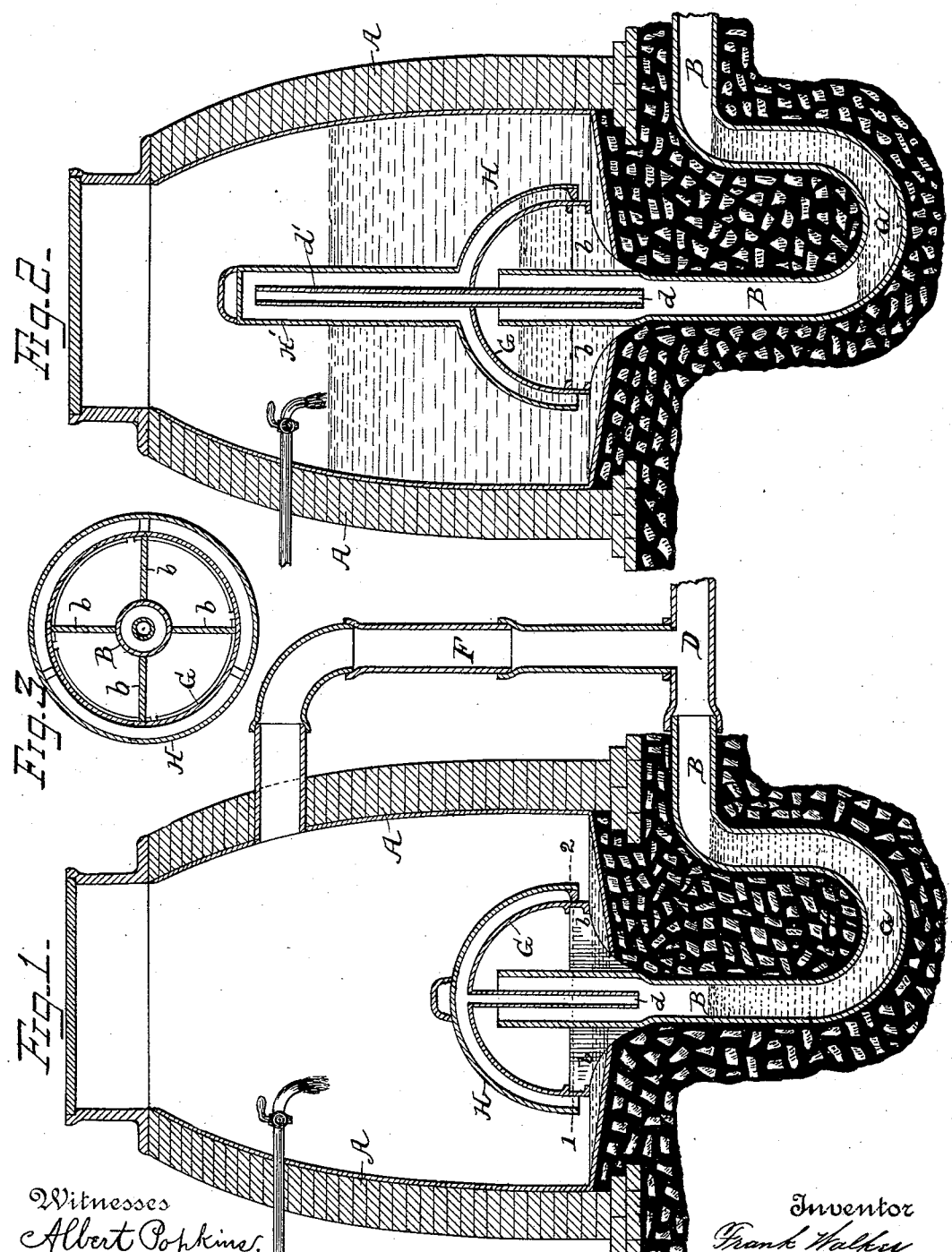
Witnesses
Albert Popkins.
Jas. L. Skidmore.
Inventor
Frank Walker
by Howsend Howson
his Attorneys.

UNITED STATES PATENT OFFICE.

FRANK WALKER, OF LOS ANGELES, CALIFORNIA.

AUTOMATIC FLUSHING APPARATUS.

SPECIFICATION forming part of Letters Patent No. 468,979, dated February 16, 1892.

Application filed March 19, 1891. Serial No. 385,625. (No model.)

*To all whom it may concern:*

Be it known that I, FRANK WALKER, a citizen of the United States, residing at Los Angeles, in the county of Los Angeles and State of California, have invented certain new and useful Improvements in an Automatic Flushing Apparatus, of which the following is a specification.

The object of my invention is to construct a siphon-flushing device for tanks or receptacles of any kind in such manner that the contents of the receptacle may be almost entirely withdrawn and the proper working of the device under all circumstances will be insured, it being impossible for the siphon to become "air-bound," although no inlet or vent valves are employed in connection with the same.

In the accompanying drawings, Figure 1 is a sectional view of a siphon flushing device constructed in accordance with my invention. Fig. 2 is a similar view illustrating a slight modification in detail; and Fig. 3 is a sectional plan on the line 1 2, Fig. 1.

A represents a tank or receptacle of any character which it is desired to drain at intervals, and B is the outlet-pipe leading from said receptacle, the mouth of the pipe being some distance above the bottom of the receptacle, and said pipe having below said bottom a bend a, forming a trap, which communicates with the main discharge-pipe D, with which also communicates a vent-pipe F, leading to the upper portion of the receptacle A.

Inclosing the mouth of the outlet-pipe B and extending down to within a short distance of the bottom of the receptacle A is a dome G, mounted upon suitable wings b, projecting from the pipes, and this dome has a depending pipe d, extending down into the outlet-pipe B to a point below the level of the bottom of the dome.

Surrounding the dome G is another dome H, suitably supported upon said dome G, but terminating at a point a slight distance above the bottom of the said dome G. It will thus be seen that the chamber within the dome G communicates directly with the outlet-pipe B, while the space between the two domes communicates with said pipe B through the depending pipe d.

The operation of the device is as follows: Supposing that the siphon action has just ceased, the levels of water in the receptacle and trap are as shown in Fig. 1. As the water rises in the receptacle A it closes the mouth of the domes G and H in succession, and when the dome H is sealed the continued rise of the water in the receptacle causes a compression of the air in the chamber formed by the two domes and the upper end of the pipe B. This compression continues and causes a gradual forcing of the water from the trap a, until by the time the water-level in the receptacle approaches the point at which the discharge is to take place the water in the trap will have been forced below the bend of the same and the compressed air will escape with a rush, thus permitting the water to rise in the domes G and H until it overflows and fills the pipe B and starts the siphon action. This action continues and the water-level in the receptacle falls until the upper dome H is unsealed, and air is allowed to pass between the domes and through the pipe d into the outlet-pipe. The air thus supplied, however, will not break the siphon, as it is surrounded by the volume of water flowing through the upper portion of the pipe B, and siphon action will continue until the water-level in the receptacle A is so reduced as to unseal the lower dome G, whereupon the siphon will be broken by the joint action of the air entering the same and that passing through the pipe d. By this means the siphon is prevented from becoming air-bound without the necessity of using any air-inlet valves such as are sometimes employed for the purpose.

In Fig. 2 the pipe d is illustrated as projecting above the top of the dome G at d', and is inclosed by a central projection or sub-dome H' on the dome H, the object being to increase the capacity of the air-chamber provided by the device, siphonage in this case being through the lower dome G only instead of through both domes, as in Fig. 1.

Having thus described my invention, I claim and desire to secure by Letters Patent—

The combination of a tank or receptacle having a trapped outlet-pipe with mouth projecting above the bottom of said receptacle, a dome surrounding said mouth and having its lower edge above the bottom of the receptacle, a pipe depending from said dome and extending into the outlet-pipe to a point below the bottom of the dome, and an outer dome inclosing a chamber communicating with the depending pipe and terminating at a point above the bottom of the inner dome, substantially as specified.

In testimony whereof I have signed my name to this specification in the presence of two subscribing witnesses.

FRANK WALKER.

Witnesses:
JAS. L. SKIDMORE,
ALBERT POPKINS.